United States Patent
Chaplin et al.

(10) Patent No.: US 10,538,622 B2
(45) Date of Patent: Jan. 21, 2020

(54) POLYMERIC MATERIALS

(71) Applicant: Victrex Manufacturing Limited, Lancashire (GB)

(72) Inventors: Adam Chaplin, Lancashire (GB); Erin Bryce, Lancashire (GB); Michael David Benstead, Stockton-on-Tees (GB); Michael Lewis Turner, Lancashire (GB)

(73) Assignee: VICTREX MANUFACTURING LIMITED, Lancashire (GB)

( * ) Notice: Subject to any disclaimer, the term of this patent is extended or adjusted under 35 U.S.C. 154(b) by 0 days.

(21) Appl. No.: 15/101,978

(22) PCT Filed: Dec. 8, 2014

(86) PCT No.: PCT/GB2014/053632
§ 371 (c)(1),
(2) Date: Jun. 6, 2016

(87) PCT Pub. No.: WO2015/087059
PCT Pub. Date: Jun. 18, 2015

(65) Prior Publication Data
US 2016/0304667 A1    Oct. 20, 2016

(30) Foreign Application Priority Data

Dec. 13, 2013 (GB) .................... 1322080.1

(51) Int. Cl.
C08G 65/40    (2006.01)
C08K 3/013    (2018.01)

(52) U.S. Cl.
CPC .......... C08G 65/4012 (2013.01); C08K 3/013 (2018.01); *C08G 2650/40* (2013.01); *C08G 2650/60* (2013.01)

(58) Field of Classification Search
CPC ............ C08G 65/4012; C08G 65/4018; C08G 65/4025; C08G 2650/40; C08G 2650/60
See application file for complete search history.

(56) References Cited

U.S. PATENT DOCUMENTS

| | | | |
|---|---|---|---|
| 4,541,884 A | 9/1985 | Cogswell et al. | |
| 4,638,037 A | 1/1987 | Ward et al. | |
| 4,774,311 A | 9/1988 | Kelsey | |
| 5,213,889 A | 5/1993 | Cogswell et al. | |
| 5,268,444 A | 12/1993 | Jensen et al. | |
| 5,312,994 A | 5/1994 | Bryant et al. | |
| 2007/0296101 A1 | 12/2007 | Dipietro et al. | |
| 2008/0175139 A1 | 7/2008 | Dipietro et al. | |
| 2008/0205253 A1 | 8/2008 | Dipietro et al. | |
| 2012/0264980 A1 | 10/2012 | Yan et al. | |

FOREIGN PATENT DOCUMENTS

| | | |
|---|---|---|
| CN | 101 759 546 A | 6/2010 |
| EP | 0 001 879 A1 | 5/1979 |
| WO | WO 2005/030836 A1 | 4/2005 |
| WO | WO 2010/072760 A1 | 7/2010 |
| WO | WO 2012/107753 A1 | 8/2012 |

OTHER PUBLICATIONS

International Search Report (PCT/ISA/210) dated Mar. 3, 2015, by the European Patent Office as the International Searching Authority for International Application No. PCT/GB2014/053632.
Written Opinion (PCT/ISA/237) dated Mar. 3, 2015, by the European Patent Office as the International Searching Authority for International Application No. PCT/GB2014/053632.
Search Report dated Jun. 8, 2015, by the British Patent Office for Application No. 1421759.0.

*Primary Examiner* — Wenwen Cai
(74) *Attorney, Agent, or Firm* — Buchanan, Ingersoll & Rooney PC

(57) ABSTRACT

Polyaryletherketones are produced which are end-capped with a phenylethynyl-containing moiety. The end-capped material, having a relatively low molecular weight, may be subjected to a thermal cycle to produce a higher molecular weight material having excellent mechanical properties, a relatively high level of crystallinity and acceptable Tm and Tg

9 Claims, No Drawings

POLYMERIC MATERIALS

This invention relates to a polymeric material and particularly, although not exclusively, relates to a polyaryletherketone, especially polyetheretherketone.

Polyaryletheretherketones, in general, have exceptional mechanical and chemical, for example solvent resistance, properties. For satisfactory mechanical properties (e.g. tensile strength, flexural strength, flexural modulus and/or elongation at break), the molecular weight (e.g. quantified in terms of reduced viscosity (RV), inherent viscosity (IV) or melt viscosity (MV)) needs to be above a minimum level. For satisfactory chemical properties, the crystallinity of the polymeric material needs to be high.

EP1879 describes the preparation and use of semi-crystalline polyaryletherketones, especially polyetheretherketone (PEEK) and suggests that, to be mechanically useful, polyaryletherketones must have an inherent viscosity (IV) of at least 0.7 dlg$^{-1}$ (which corresponds to a reduced viscosity (RV) of at least 0.8 dlg$^{-1}$).

It has been recognised that it can be difficult to use polyaryletherketones having an IV of at least 0.7 dlg$^{-1}$ in making complex parts by injection moulding or making highly filled composite materials, since, at the specified IV, the viscosity of the polymeric material may be too high for satisfactory flow into narrow openings in moulds and/or may be too high to fully wet out fillers, for example fibres, in composite materials.

U.S. Pat. No. 4,541,884 recognises the problem of impregnating and/or wetting fibrous masses in the production of composite materials and solves the problem by use of a melt comprising a mixture of thermoplastic polymer and a relatively high level of plasticizer for the polymer which is thermally stable but can be volatilised from the melt. Use of the plasticizer plasticizes the polymer in the melt to provide a melt of reduced viscosity compared with the melt viscosity of the polymer alone. Subsequently, it is volatilised.

WO2005/030836 solves the problem, inter alia, of injection moulding components having relatively thin walls by using a polyaryletherketone having a relatively low melt viscosity (MV) in the range 0.05 to 0.12 KNsm$^{-2}$ which was found, contrary to the teaching in EP 1879, to have excellent mechanical properties. WO2006/106352 discloses using the same low MV polyaryletherketone to produce highly filled polymeric materials.

U.S. Pat. No. 5,213,889 solves the problem of wetting of fibrous masses in producing a composite material by using a thermoplastic polymer having a very low melt viscosity to enable wetting of the fibres. The disclosure envisages processing steps to increase the molecular weight of the polymer, after preparation of the composite material, to improve its mechanical properties.

U.S. Pat. No. 4,638,037 describes one method of increasing molecular weight of polyaryletherketones which, in preferred embodiments, comprises introducing an alkaline salt of a Group I or Group II metal at a concentration of at least 0.005 wt %. The salt has nucleophilic activity. When the mixture of polymer and salt is heated to a temperature above the melting point of the polymer, the molecular weight (e.g. MV) of the polymer increases. Disadvantageously, however, it is difficult to control the process and use of the salt contaminates the polymer, which may necessitate an additional purification step to reduce salt levels in the polymer.

It should be appreciated that, whilst it may be possible to increase molecular weight of polyaryletherketones by using various methods, it is important to retain a sufficient level of crystallinity (in addition to improved mechanical properties) if the polyaryletherketone is to be usable in situations wherein both mechanical and chemical properties are important. Thus, whilst molecular weight of polymeric materials may be increased by cross-linking, that often leads to a significant, detrimental reduction in crystallinity.

Thus, any process for improving mechanical properties of polyaryletherketones should, ideally, still retain substantial crystallinity in the polyaryletherketone. Furthermore, other physical properties, for example glass transition temperature (Tg) and melting temperature (Tm) should be satisfactory. Additionally, any process used should ideally: not produce any undesirable by-products (e.g. salts or gases); be usable in existing chemical plants which produce polyaryletherketones (e.g. not require significant additional equipment or process steps); produce parts with improved properties without significant additional downstream processing (e.g. curing or purification steps); and allow the polymeric material to be melt processed in substantially the same manner as used for existing commercially available polyaryletherketones.

It is one object of the invention to address at least some of the aforementioned problems.

It is an object of preferred embodiments of the invention to provide a polymeric material which can be used to produce parts (which may include thin walls and/or may be highly filled) having excellent mechanical and chemical properties.

According to a first aspect of the invention, there is provided a polymeric material comprising a repeat unit of formula

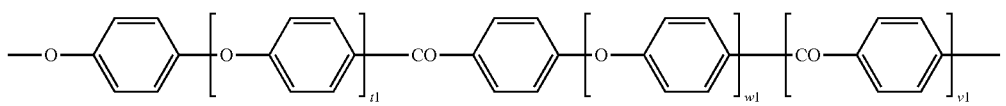

wherein t1 and w1 independently represent 0 or 1 and v1 represents 0, 1 or 2;

wherein said polymeric material also includes a phenylethynyl moiety and wherein, preferably, said polymeric material has a Reduced Viscosity (RV) of at least 0.6 dL/g.

Unless otherwise stated herein, RV is suitably measured as described in Procedure 1 hereinafter.

The presence and/or level of phenylethynyl moieties in said polymeric material may be confirmed by 13C NMR or MALDI-ToF mass spectrometry.

Said polymeric material may have an RV of at least 0.6 dL/g, preferably at least 0.8 d/Lg. The RV may be less than 2.0 dL/g. Thus, said polymeric material preferably has an RV in the range 0.6 to 2.0 dL/g, more preferably, the RV is in the range 0.7 to 1.0 dL/g; especially 0.7 to 0.8 dL/g.

Said phenylethynyl moiety may include a linking moiety L$^1$ by means of which it is incorporated into the polymeric material and/or by means of which it is bonded to the repeat unit of Formula I.

Said linking moiety may include an aromatic moiety which is suitably bonded directly to the phenylethynyl moiety (at an end opposite to the end of the ethynyl moiety which is bonded to the phenyl moiety of said phenylethynyl moiety). Said phenylethynyl moiety may be of formula

     II wherein $Ph^1$ represents optionally-substituted phenyl, $Ph^2$ represents optionally-substituted phenyl and $L^1$ represents a linking moiety by means of which said phenylethynyl moiety II is incorporated into the polymeric material and/or by means of which it is bonded to the repeat unit of Formula I.

$L^1$ may comprise an aromatic moiety, suitably an aromatic moiety which includes an aromatic 6-carbon atom containing ring, for example an optionally substituted phenyl moiety.

Moiety $-Ph^2-L^1$ preferably comprises a benzophenone moiety.

Moiety $-Ph^2-L^1$ may be selected from the following:

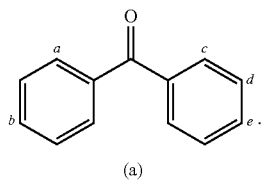

(a)     V wherein "a" or "b" represent the carbon atom bonded to the repeat unit of formula I and the atom bonded to the ethynyl carbon atom is selected from "c", "d" and "e".

In compound V, "b" preferably represents the carbon atom bonded to the repeat unit of formula I and the atom bonded to the ethynyl carbon atom is selected from "d" or "e"; and

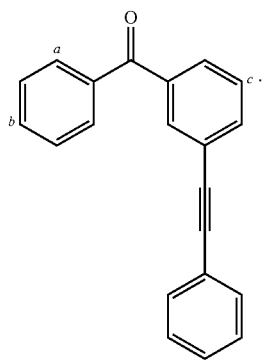

(b)     VI wherein "a" or "b" represent the carbon atom bonded to the repeat unit of formula I and the atom bonded to the ethynyl carbon atom is atom "c".

Preferred moieties $-Ph^2-L^1$ are of formula V.

Moiety $Ph^1$ may be selected from an unsubstituted phenyl moiety and a phenyl moiety substituted with an optionally-substituted phenylcarbonyl moiety. Preferably, $Ph^1$ is an unsubstituted phenyl moiety.

Preferably, said polymeric material incorporates a phenylethynyl moiety which comprises, preferably consists of, a moiety of formula

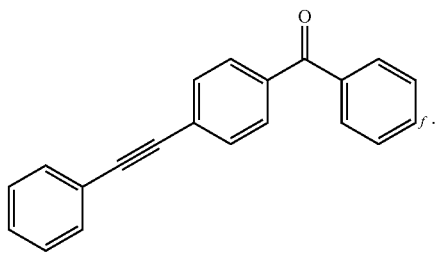     VII wherein the carbon atom bonded to another atom (e.g. the repeat unit of formula I) is atom "f".

The Tg and/or Tm of said polymeric material may be substantially the same (e.g. to within ±1° C.) of the Tg and Tm of the same polymeric material but in the absence of said phenylethynyl moiety.

Crystallinity of said polymeric material cannot be measured by techniques which involve melting of the polymeric material because the phenylethynyl moiety will react leading to an increase in molecular weight (e.g. RV). However, crystallinity may be measured by wide angle X-ray diffraction (also referred to as Wide Angle X-ray Scattering or WAXS), for example as described by Blundell and Osborn (Polymer 24, 953, 1993). The level of crystallinity in said polymeric material, measured by WAXS as described, may be at least 5%, preferably at least 10%, more preferably at least 15%, especially at least 20%. The crystallinity may be less than 40% and less than 35%. Preferably, the crystallinity is in the range 15 to 35%.

Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have a repeat unit wherein t1=1, v1=0 and w1-0; or t1=0, v1=0 and w1=0. The most preferred has a repeat unit wherein t1=1, v1=0 and w1=0.

Said polymeric material suitably includes at least 50 mol %, (e.g. 50-99.8 mol %), preferably at least 60 mol % (e.g. 60-99.8 mol %), more preferably at least 68 mol % (e.g. 68 to 100 mol %), of repeat units of formula I, especially such units where t1=1, v1=0 and w1=0. Other repeat units in said first polymer may be of formula I; or may include -Ph-Ph- moieties where Ph suitably represents an unsubstituted phenylene moiety (especially wherein both -Ph- moieties are 4,4'-substituted). Other repeat units may include Ph moieties bonded to two moieties selected from carbonyl moieties and ether moieties; and -Ph-Ph- moieties bonded to two ether moieties.

Said polymeric material suitably includes at least 50 wt % (e.g. 50-99.8 wt %) of repeat units of formula I.

Said polymeric material may be a copolymer which comprises a first moiety of formula I and a second moiety which includes -Ph-Ph- moieties where Ph represents an unsubstituted phenylene moiety (which suitably includes 4,4'-bonds to adjacent moieties).

In one embodiment, said polymeric material may be selected from: a polymer comprising at least 98 mol % and/or comprising at least 98 wt % of a repeat unit of formula I, especially such units wherein t1=1, v1=0 and w1=0; and a copolymer which includes a repeat unit of formula —O-Ph-O-Ph-CO-Ph-     VIII and a repeat unit of formula —O-Ph-Ph-O-Ph-CO-Ph-     IX wherein Ph represents a phenylene moiety.

Said polymeric material preferably includes at least 98 wt % (e.g. 98 to 99.9 wt %) of a repeat unit of formula I or a copolymer which includes repeat units of formulae VIII and IX.

In said copolymer, said repeat units VIII and IX are preferably in the relative molar proportions VIII:IX of from 65:35 to 95:5.

The phenylene moieties (Ph) in each repeat unit VIII and IX may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. It is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula VIII have 1,4-linkages to moieties to which they are bonded. It is especially preferred that each phenylene moiety in the repeat unit of formula VIII has 1,4-linkages to moieties to which it is bonded.

In a preferred embodiment, at least 95%, preferably at least 99%, of the number of phenylene moieties (Ph) in the repeat unit of formula IX have 1,4-linkages to moieties to which they are bonded. It is especially preferred that each phenylene moiety in the repeat unit of formula IX has 1,4-linkages to moieties to which it is bonded.

Preferably, the phenylene moieties in repeat unit of formula VIII are unsubstituted. Preferably, the phenylene moieties in repeat unit of formula IX are unsubstituted.

Said repeat unit of formula VIII suitably has the structure:

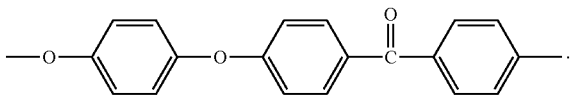

X

Said repeat unit of formula IX suitably has the structure:

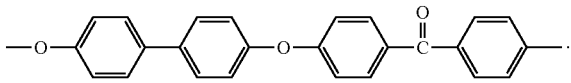

XI

Said copolymer may include at least 68 mol %, preferably at least 71 mol % of repeat units of formula X. Particular advantageous copolymers may include at least 72 mol %, or, especially, at least 74 mol % of repeat units of formula X. Said copolymer may include less than 90 mol %, suitably 82 mol % or less of repeat units of formula X. Said copolymer may include 68 to 82 mol %, preferably 70 to 80 mol %, more preferably 72 to 77 mol % of units of formula X.

Said copolymer may include at least 10 mol %, preferably at least 18 mol %, of repeat units of formula XI. Said copolymer may include less than 32 mol %, preferably less than 29 mol % of repeat units of formula XI. Particularly advantageous copolymers may include 28 mol % or less; or 26 mol % or less of repeat units of formula XI. Said copolymer may include 18 to 32 mol %, preferably 20 to 30 mol %, more preferably 23 to 28 mol % of units of formula XI.

The sum of the mol % of units of formula X and XI in said copolymer is suitably at least 95 mol %, is preferably at least 98 mol %, is more preferably at least 99 mol %.

In an especially preferred embodiment, said polymeric material includes at least 90 mol %, preferably at least 95 mol %, more preferably at least 98 mol %, especially at least 99 mol % of repeat units of formula I, especially repeat units of formula I wherein t1=1, v1=0 and w1=0. Said polymeric material suitably include 95 to 99.9 mol % (preferably 98 to 99.9 mol %, especially 99 to 99.8 mol %) of repeat units of formula I wherein t1=1, v1=0 and w1=0 and 0.1 to 5 mol % (preferably 0.1 to 2 mol %, especially 0.2 to 1.0 mol % of phenylethynyl moieties. In an especially preferred embodiment said polymeric material includes 99.2 to 99.8 mol % of repeat units of formula I wherein t1=1, v1=0 and w1=0 and 0.2 to 0.8 mol % of said phenylethynyl moieties.

In said especially preferred embodiment, said polymeric material includes 98 to 99.9 wt % of repeat units of formula I.

In a preferred embodiment, said polymeric material includes moieties of structure

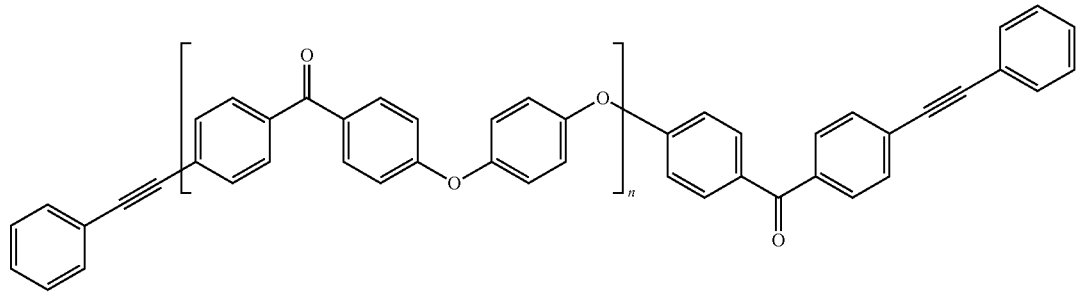

wherein n is an integer which is, on average, at least 18, preferably at least 25, more preferably at least 30. Integer n may be 200 or less.

Said polymeric material may be in the form of pellets or granules, wherein the pellets or granules include at least 95 wt %, preferably at least 99 wt %, especially about 100 wt % of said polymeric material. Pellets or granules may have a maximum dimension of less than 10 mm, preferably less than 7.5 mm, more preferably less than 5.0 mm.

Said polymeric material may be part of a composition which may include said polymeric material and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre. A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material and said filler means are mixed at an elevated temperature, suitably at a temperature at or above the melting temperature of said polymeric material, but below (e.g. at least 30° C., 40° C. or 50° C. below) the temperature at which the ethynyl groups react. Thus, suitably, said polymeric material and filler means are mixed whilst the polymeric material is molten. Said elevated temperature is suitably below the decomposition temperature of the polymeric material. Said elevated temperature is preferably at or above the main peak of the melting endotherm (Tm) for said polymeric material. Said elevated temperature is preferably at least 300° C. Advantageously, the molten polymeric material can readily wet the filler and/or penetrate consolidated fillers, such as fibrous mats or woven fabrics, so the composite material prepared comprises the polymeric material and filler means which is substantially uniformly dispersed throughout the polymeric material.

The composite material may be prepared in a substantially continuous process. In this case polymeric material and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising said polymeric material. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of said polymeric material and a predetermined amount of said filler means may be selected and contacted and a composite material prepared by causing the polymeric material to melt and causing the polymeric material and filler means to mix to form a substantially uniform composite material.

The composite material may be formed into a particulate form for example into pellets or granules. Pellets or granules may have a maximum dimension of less than 10 mm, preferably less than 7.5 mm, more preferably less than 5.0 mm.

Preferably, said filler means comprises one or more fillers selected from glass fibre, carbon fibre, carbon black and a fluorocarbon resin. More preferably, said filler means comprises glass fibre or carbon fibre.

A composition or composite material as described may include 20 to 99.9 wt % (e.g. 20 to 70 wt %) of said polymeric material and 0.1 to 80 wt % (e.g. 30 to 80 wt %) of filler means. Preferred embodiments include greater than 10 wt %, more preferably greater than 40 wt % of filler means.

In an especially preferred embodiment, a said polymeric material which is part of a said composition has a Tm of less than 350° C., preferably less than 330° C., more preferably less than 315° C. Polymeric materials which include repeat units of formula VIII and IX may be particularly preferred.

The invention extends to a composition or composite material as described per se.

Said polymeric materials may be provided in a pack. Said pack may include at least 1 kg, suitably at least 5 kg, preferably at least 10 kg, more preferably at least 14 kg of material of which at least a part is made up of a said polymeric material. Said pack may include 1000 kg or less, preferably 500 kg or less of said polymeric material. Preferred packs include 10 to 500 kg of said polymeric material.

Material in said pack may be in powder or granular form.

Said pack may comprise packaging material (which is intended to be discarded or re-used). Said packaging material preferably substantially fully encloses said polymeric material. Said packaging material may comprise a first receptacle, for example a flexible receptacle such as a plastics bag in which said polymeric material is arranged. The first receptacle may be contained within a second receptacle for example in a box such as a cardboard box.

In a second aspect of the invention, there is provided a polymeric material comprising a repeat unit of formula

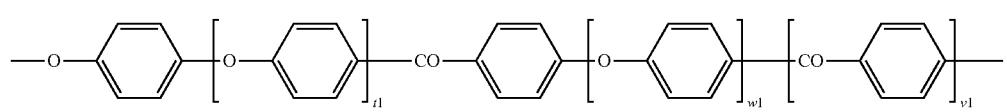

I where t1 and w1 independently represent 0 or 1 and v1 represents 0, 1 or 2;

wherein said polymeric material also includes a phenylethynyl moiety and said polymeric material includes at least 60 mol % (e.g. 60-99.9 mol %), more preferably at least 68 mol % (e.g. 68-99.9 mol %) of repeat units of formula I, especially such units wherein t1=1, v1=0 and w1=0.

The polymeric material of the second aspect may include any features of the polymeric material of the first aspect.

According to a third aspect of the invention, there is provided a process for preparing a polymeric material for example as described according to the first and/or second aspects, the process comprising:
(i) selecting one or more monomers arranged to be polymerised to define a polymeric material comprising a repeat unit of formula

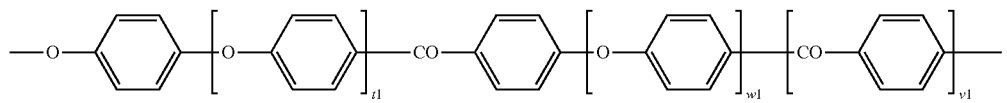

where t1 and w1 independently represent 0 or 1 and v1 represents 0, 1 or 2;
(ii) reacting said one or more monomers in the presence of an ethynyl compound which includes a phenylethynyl moiety in order to incorporate the ethynyl compound into the polymeric material.

In relation to the total weight of compounds used in the process and incorporated (at least in part) into the polymeric material, the sum of the wt % of said one or more monomers, referred to in point (i), used in the process is preferably at least 95 wt %, more preferably at least 98 wt %, especially at least 99 wt %. The sum may be in the range 95 to 99.9 wt %, preferably in the range 98 to 99.9 wt %, more preferably 99 to 99.8 wt %. The wt % of said ethynyl compound used in the process may be 5 wt % or less, preferably 2 wt % or less, more preferably 1 wt % or less. The wt % of said ethynyl compound used in the process may be in the range 0.1 to 5 wt %, preferably in the range 0.1 to 2 wt %, more preferably in the range 0.2 to 1 wt %.

The ratio of the total weight of said one or more monomers used in point (i) divided by the weight of said ethynyl compound referred to in point (ii) is suitably in the range 50 to 200, for example in the range 90 to 200.

The ratio defined as the number of moles of said ethynyl compound divided by the total number of moles of other monomers used in the process is suitably in the range 0.001 to 0.005, preferably in the range 0.0015 to 0.004.

The ratio defined as the number of moles of said ethynyl compound divided by the number of moles of the monomer which is present in the highest amount in the process may be in the range 0.001 to 0.01, preferably in the range 0.002 to 0.008, In point (i), the method preferably comprises selecting a first monomer which is a dihydroxy compound and a second monomer which is a dihalocompound. Preferred dihalocompounds include dichloro and difluoro compounds. In a preferred embodiment, said first monomer is selected from:

a dihydroxybenzene compound of formula:

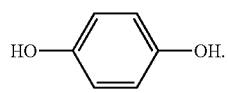

XX and a dihydroxybiphenyl compound of formula

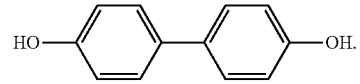

XXI

In said preferred embodiment, said second monomer is of formula:

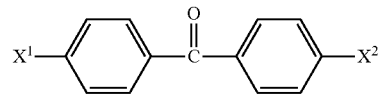

XXII where $X^1$ and $X^2$ independently represent halogen atoms, preferably selected from chlorine and fluorine atoms. Preferably, $X^1$ and $X^2$ represent fluorine atoms.

Preferably, the sum of the wt % (based on the total wt % of reagents incorporated into the polymer in the process) of monomers of formulae XX, XI and XXII used in the process is at least 95 wt %, preferably at least 98%, more preferably at least 99 wt %. The sum may be less than 99.9 wt %

Preferably, the number of moles of monomers which include chlorine or fluorine atoms which are polycondensed in the process is at least equal to the number of moles of monomers which include two hydroxy groups (e.g. compounds XX and XXI). It is especially preferred that the number of moles of monomers which include chlorine or fluorine atoms (e.g. compound XXII) is slightly greater than the number of moles of monomers which include two hydroxy groups.

Said process is preferably carried out in the presence of a solvent. The solvent may be of formula

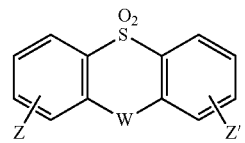

where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxanthin dioxide and 4-phenylsulphonyl biphenyl. Diphenylsulphone is a preferred solvent.

The process is preferably carried out under substantially anhydrous conditions. In the process, the compounds of formulae XX, XXI, XXII and said ethynyl compound are suitably contacted in the presence of said solvent, especially diphenylsulphone. Polymerisation is suitably effected at a temperature within the range 150°-400° C.

Said ethynyl compound preferably includes a phenylethynyl moiety as described according to the first aspect. Preferably, said ethynyl compound comprises said phenylethynyl moiety which is bonded to a leaving group, which is preferably a halogen atom (e.g. CI and F). Said ethynyl compound preferably includes a fluorine atom and suitably comprises a said phenylethynyl moiety bonded to a fluorine atom. Said ethynyl compound is preferably a fluorophenylethynylbenzophenone and, more preferably, is selected from 4-fluorophenylethynylbenzophenone and 3-fluorophenylethynylbenzophenone.

According to a fourth aspect of the invention, there is provided a method of making a component, the method comprising:
(i) selecting a polymeric material as described according to the first aspect (or a polymeric material as described according to the second aspect);
(ii) melt processing said polymeric material so as to define the component.

Melt processing suitably comprises heating the polymeric material above its Tm measured as described hereinafter. Said melt processing may comprise extruding or moulding, for example injection moulding the polymeric material.

The method preferably comprises selecting at least 10 g, for example 20 g to 1 kg to make said component. The component may incorporate 10 to 1000 g of said polymeric material.

Said polymeric material selected is preferably in the form of pellets or granules.

During the melt processing of the polymeric material, its molecular weight, suitably illustrated by its RV, rises, as the phenylethynyl moiety in said polymeric material reacts.

The RV of said polymeric material after said method is suitably higher by at least 0.1 dL/g compared to the RV of said polymeric material selected in step (i). The ratio of the RV of the polymeric material in said component, after step (ii), divided by the RV of the polymeric material selected in step (i) may be at least 1.1 or at least 1.2. Said ratio may be in the range 1.1 to 2, preferably 1.2 to 1.7.

Advantageously, said polymeric may have substantial crystallinity after step (ii) and/or in said component. Said polymeric material of said component preferably has a crystallinity of at least 10%, at least 15% or at least 20%, suitably measured as described in the Examples which follow. The crystallinity may be in the range 10 to 40%, for example 15 to 35%.

Alternatively, crystallinity may be measured by WAXS as described herein. When measured by WAXS, said polymeric material of said component may be in the range 10 to 40%, for example 15 to 35%.

The Tm (suitably measured as described herein) of said polymeric material of said component may be at least 300° C., for example at least 320° C. or at least 330° C. Said Tm may be less than 350° C. or less than 340° C.

The Tg (suitably measured as described herein) of said polymeric material of said component may be in the range 135° C. to 160° C., for example in the range 135° C. to 150° C.

The fact said polymeric material has a Tg and Tm may suggest it is only relatively lightly cross-linked, for example by reaction of phenylethynyl moieties.

The difference between the Tm of the polymeric material selected in step (i) of the method and the Tm of said polymeric material after melt-processing is suitably at least 1° C., preferably at least 2° C., The difference may be less than 10° C. The Tm of said polymeric material after melt-processing is preferably lower than the Tm before melt-processing.

The difference between the Tg of the polymeric material selected in step (i) of the method and the Tg of said polymeric material after melt-processing is suitably at least 2° C., preferably at least 5° C. The difference may be less than 12° C. The Tg of said polymeric material after melt-processing is preferably higher than the Tg before melt-processing.

The tensile strength of said polymeric material of said component measured as described herein in accordance with ISO527 may be at least 90 MPa, preferably at least 100 MPa. It may be in the range 100 MPa to 125 MPa.

The tensile modulus of said polymeric material of said component measured as described herein in accordance with ISO527 may be at least 4 GPa, for example in the range 3.5 to 4.5 GPa.

The invention extends to a component made in a method according to the fourth aspect.

According to a fifth aspect, there is provided a component which comprises a polymeric material which includes a repeat unit of formula I as described in the first aspect, wherein t1=1, w1=0 and v1=0, wherein said polymeric material includes greater than 98 mol % or greater than 98 wt % of repeat units of formula I, wherein the Tg of said polymeric material is at least 145° C., preferably at least 146° C., more preferably at least 147° C. The Tm may be less than 343° C., less than 342° C. or less than 341° C. Said polymeric material may include greater than 99 mol % or greater than 99 wt % of repeat units of formula I, Any invention describe herein may be combined with any feature of any other invention described herein mutatis mutandis.

Specific embodiments of the invention will now be described, by way of example.

The following materials are referred to hereinafter:
4-fluorophenylethynylbenzophenone (4-FPEB)—obtained from Nexam Chemicals

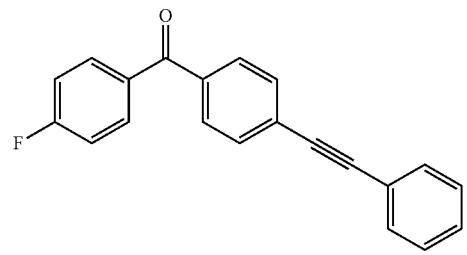 [SMILES: O=C(c1ccc(F)cc1)c1ccc(C#Cc2ccccc2)cc1]

3-fluorophenylethynylbenzophenone (3-FPEB)—obtained from Nexam Chemicals

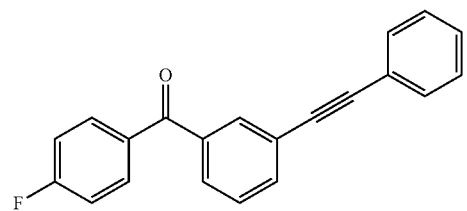 [SMILES: O=C(c1ccc(F)cc1)c1cccc(C#Cc2ccccc2)c1]

PEEK 90—refers to polyetheretherketone (PEEK) having MV of 0.09 KNsm$^{-2}$ and RV of 0.76 dL/g obtained from Victrex Manufacturing Ltd.

PEEK 150—refers to polyetheretherketone (PEEK) having MV of 0.15 KNsm$^{-2}$ and RV of 0.88 dL/g obtained from Victrex Manufacturing Ltd.

PEEK 450—refers to polyetheretherketone (PEEK) having MV of 0.45 KNsm$^{-2}$ and RV of 1.21 dL/g obtained from Victrex Manufacturing Ltd.

In general terms, in the processes which follow, polyetheretherketone is produced which is end-capped with a phenylethynyl-containing moiety in accordance with the reaction scheme below:

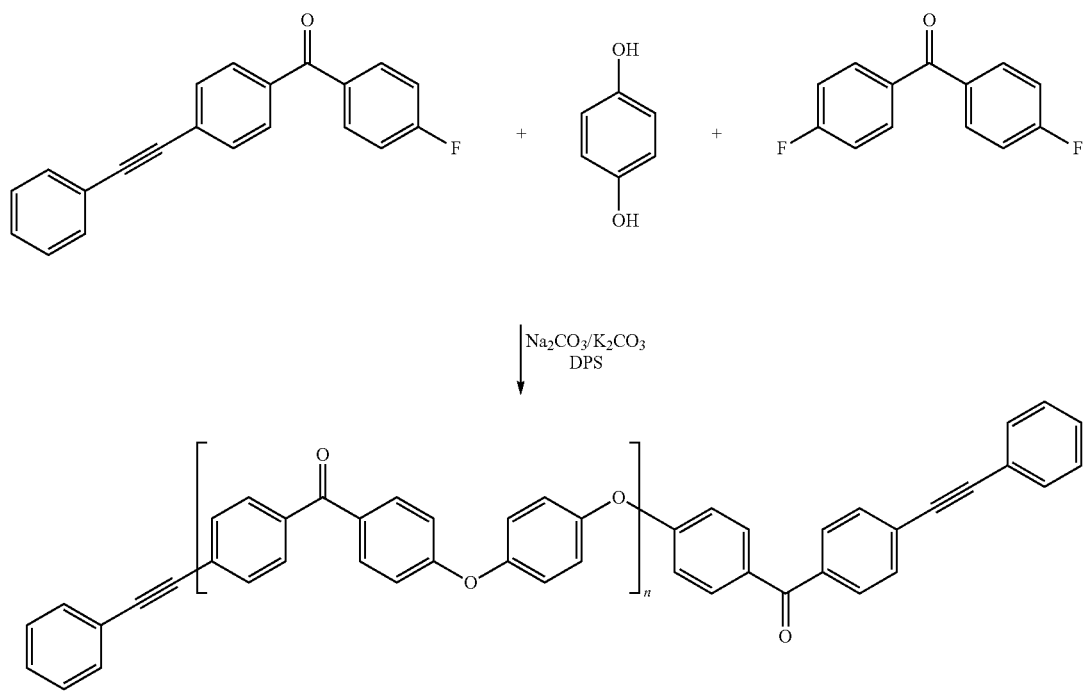

The end-capped material, having a relatively low molecular weight, may be subjected to a thermal cycle to produce a higher molecular weight material having excellent mechanical properties, a relatively high level of crystallinity and acceptable Tm and Tg.

Unless otherwise stated, Reduced Viscosity (RV) is measured as described in Procedure 1.

Procedure 1—Measurement of Reduced Viscosity (RV)

RV for the non-cured, cured and injection moulded polymers was measured according to ASTM D2857-95 on a 1% (w/v) solution of the polymer in concentrated sulphuric acid (98%, 1.84 g/cm$^3$) using an Ubbelohde viscometer (D type) at 25° C. Polymer powder (1.0000 g±0.0001 g) was dissolved in 100 ml±0.2 ml of concentrated sulphuric acid (98%, 1.84 g/cm$^3$) at room temperature. The solution was agitated to facilitate dissolution and filtered through a No. 1 sintered funnel before use. RV was calculated as RV=(t1 −t0)/(t0×C) where t1 and t0 are the flow times measured for the solution and the solvent respectively and C is the concentration of the solution in g/dL. The flow time of the solution was measured immediately after preparation of the solution to avoid sulfonation of the polymer. No correction for kinetic energy was applied.

A range of end-capped materials were prepared, as described in Examples 1 to 11.

EXAMPLE 1

Preparation of 4-FPEB-capped PEEK

To a 500 mL flange flask fitted with an air condenser, nitrogen inlet and an overhead torque stirrer were added 4,4'-difluorobenzophenone (BDF) (109.92 g, 0.504 mol), hydroquinone (HQ) (55.06 g, 0.50 mol), and 4-fluorophenylethynylbenzopheone (4-FPEB) (0.75 g, 0.0025 mol) and diphenylsulfone (DPS) (224 g). The flask was purged with nitrogen for 30 mins. The mixture was then heated to 160° C. and a mixture of sodium carbonate (53.26 g, 0.503 mol) sieved through a screen of mesh size 500 µm and potassium carbonate (1.38 g, 0.001 mol) was added to the reaction mixture. The temperature was raised to 315° C. at 1° C. min$^{-1}$ and held at this temperature until the desired torque rise was reached. The required torque rise was determined from a calibration graph of torque rise versus RV. The reaction mixture was then poured into a foil tray and allowed to cool, milled and washed with 2 L of acetone and then warm water (40-50° C.) until the conductivity of the waste water was ≤2 µS. The resulting polymer powder was dried in an air oven for 16 hours at 130° C. and had RV of 0.89 dL/g

EXAMPLES 2 TO 6

Preparation of Other End-capped PEEKs

By processes similar to Example 1 other 4-FPEB-capped and 3-FPEB-capped PEEK polymers were prepared. The type and amount of end capping reagents (and BDF) used were as detailed in Table 1. Note in each example, the amounts of HQ and DPS were as described in Example 1.

TABLE 1

| Example No. | End-capping reagent | End-capping reagent (mol) | BDF (mol) | Cross-linker loading (mol %) | RV of end capped polymer (dL/g) |
|---|---|---|---|---|---|
| 1 | 4-FPEB | 0.0025 | 0.504 | 0.5 | 0.89 |
| 2 | 3-FPEB | 0.0025 | 0.504 | 0.5 | 0.94 |
| 3 | 4-FPEB | 0.0025 | 0.504 | 0.5 | 1.09 |
| 4 | 4-FPEB | 0.0025 | 0.504 | 0.5 | 1.21 |
| 5 | 4-FPEB | 0.0015 | 0.506 | 0.3 | 1.03 |
| 6 | 4-FPEB | 0.0015 | 0.506 | 0.3 | 1.24 |

Note:
"Cross-linker loading (mole %)" is defined as (moles of end-capping reagent/moles of BDF) × 100%.

EXAMPLE 7

Scale-up of 4-FPEB End-capped PEEK

A 70 litre stainless steel reactor fitted with a lid, stirrer/stirrer guide, nitrogen inlet and outlet was charged with diphenylsulphone (DPS) (20.5 kg) and heated to 160° C. Once the diphenylsulfone had fully melted, hydroquinone (HQ) (3.85 kg, 35.00 mol) 4, 4'-difluorobenzophenone (BDF) (7.73 kg, 35.44 mol) and 4-fluorophenylethynylbenzophenone (4-FPEB) (0.053 kg, 0.175 mol) were charged to the reactor under nitrogen. Dried sodium carbonate (3.73 kg, 35.18 mol) sieved through a screen with a mesh of 500 μm and potassium carbonate (0.097 kg, 0.70 mol) was added. The contents were then heated to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached as determined by the torque rise of the stirrer. The required torque rise was determined from a calibration graph of torque rise versus RV. The reaction mixture was poured via a band caster into a water bath, allowed to cool, milled and washed with 400 litres of acetone and 1000 litres of water. The resulting polymer powder was dried in a tumble dryer until the contents temperature measured 110° C. The resulting end-capped polymer had RV of 1.00 dL/g.

EXAMPLES 8-11

By processes similar to Example 7 other 4-FPEB-capped polymers were prepared. The amount of end capping reagent used was as detailed in Table 2.

TABLE 2

| Example No. | End-capping reagent | End-capping reagent (mol) | BDF (mol) | Cross-linker loading (mol %) | RV of end capped polymer (dL/g) |
|---|---|---|---|---|---|
| 7 | 4-FPEB | 0.175 | 35.44 | 0.5 | 1.00 |
| 8 | 4-FPEB | 0.175 | 35.44 | 0.5 | 1.14 |
| 9 | 4-FPEB | 0.175 | 35.79 | 0.5 | 0.76 |
| 10 | 4-FPEB | 0.175 | 35.44 | 0.5 | 1.19 |
| 11 | 4-FPEB | 0.175 | 35.79 | 0.5 | 0.88 |

Note:
In each of Examples 8 to 11, the amount of HQ and DPS were as described in Example 7. "Cross-linker loading (mole %)" is defined as (moles of end-capping reagent/moles of BDF) × 100%.

EXAMPLE 12

Curing of Polymeric Materials

Respective dried samples of polymer from examples 1-6 were compression moulded into amorphous films by heating 5 g of polymer in a mould at 400° under a pressure of 50 bar producing a film of dimensions 120 mm×120 mm with a thickness of 0.2 mm. The pressure was released but the films were maintained between the platens of the press for 2 hours at 400° C. to cure the materials, before being quenched in cold water.

Respective polymers from examples 7, 8 and 10 were cured by heating samples up to 400° C. and holding for 2 hours in a DSC pan according Procedure 2 below.

Polymers from Examples 9 and 11 were injection moulded into test bars using an injection moulding machine with a tool temperature of 150° C., barrel temperature of 360° C., nozzle temperature of 390° C., holding pressure of 30 bar, injection pressure of 60 bar until the mould was filled then 100 bar for 10 seconds. The screwback pressure was 10 bar and the screwback speed 175 mm/s. The bars were then cured by placing them in a steel tool which was then placed between the platens of a hot press at 400° C. for 2 hours.

The following further procedures are used to assess properties of materials described herein:

Procedure 2—Measurement of Tg, Tm, % Crystallinity

A DSC analysis was undertaken on end-capped polymers made as described in the examples using a Perkin Elmer Jade system.

An 8 mg sample of film from examples 1-6 obtained as described in Example 12, an 8 mg sample of polymer powder from examples 7, 8 and 10 and an 8 mg sample shaved from the injection moulded test bars from examples 9 and 11 were scanned by DSC to determine Tg and Tm as follows:

Samples were heated up from 30° C. to 400° C. at 10° C. per min, held at 400° C. for 1 minute (for examples 1-6, 9 and 11) or 2 hours (examples 7, 8 and 10) then cooled back down to 100° C. at the same rate. The samples were then re-heated to 400° C. at 10° C. per min, held for 1 minute at 400° C. before cooling back again to 30° C.

From the DSC trace from the second heat/cool cycle, the onset of the Tg was obtained as the intersection of the lines drawn along the pre-transition baseline and a line drawn along the greatest slope obtained during the transition. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition; the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

Procedure 3—Gel Time

Gel time was measured using a parallel plate rheometer equipped with 25 mm plates with a 2 mm gap. A thermal sweep was performed at 400° C. over 1 hour and the gel time was determined by observing the time taken for the phase angle to pass through 45°.

Procedure 4—Fracture Energy Density

Fracture toughness testing was carried out on an Instron 3369 testing machine operating with a 30 kN load cell using a notched ASTM impact bar (8 mm notch) in accordance with ASTM D5045-99

Procedure 5—Tensile Testing

Tensile testing was carried out on an Instron 3369 testing machine operating with a 30 kN load cell with an extension rate of 5 mm per min, 25 mm gauge length and 40 mm crosshead separation using a 1BA ISO test bar in accordance with ISO 527. Tensile strength, tensile modulus and elongation at break were determined.

Results

Properties of Cured Samples of Examples 1 to 6 Polymers are Included in Table 3

TABLE 3

| Example No. | Starting RV (dL/g) | Post curing RV (dL/g) | Tg post cure (° C.) | Tm post cure (° C.) | Crystallinity (X %) |
|---|---|---|---|---|---|
| 1 | 0.89 | 1.32 | 151 | 332 | 26 |
| 2 | 0.94 | 1.65 | 154 | 326 | 24 |
| 3 | 1.09 | 1.04 | 150 | 331 | 28 |
| 4 | 1.21 | 1.29 | 148 | 334 | 31 |
| 5 | 1.03 | 1.58 | 149 | 333 | 31 |
| 6 | 1.24 | 1.59 | 151 | 331 | 29 |

Properties of cured samples of Examples 7 to 10 polymers are included in Table 4. The post-cured RV was not measured on Examples 7, 8 and 10 as films were not prepared. The samples were cured during the DSC process. Only a small (8 mg) sample was used which was not sufficient for RV measurement. Nonetheless, the results do demonstrate an increase in Tg and decrease in Tm on curing.

TABLE 4

| Example No. | Starting RV (dL/g) | Tg post cure (° C.) | Tm post cure (° C.) | Crystallinity (X %) |
|---|---|---|---|---|
| 7 | 1.00 | 150 | 328 | 20 |
| 8 | 1.14 | 151 | 315 | 19 |
| 10 | 1.19 | 150 | 318 | 21 |

Properties of the moulded samples of Examples 9 and 11 were assessed and results are provided in Table 5.

TABLE 5

| Example No. | Starting RV (dL/g) | Post moulding RV (dL/g) | Tg post cure (° C.) | Tm post cure (° C.) | Crystallinity (X %) | Gel time @ 400° C.(mins) |
|---|---|---|---|---|---|---|
| 9 | 0.76 | 0.90 | 137 | 340 | 39 | 27 |
| 11 | 0.88 | 1.24 | 145 | 334 | 28 | 6 |

Mechanical properties of moulded samples were assessed and compared to commercially available PEEK 90, PEEK 150 and PEEK 450 materials. Results are provided in Table 6.

TABLE 6

| Example No. | RV pre moulding (dL/g) | Fracture Energy density (kJm−2) | Tensile strength (MPa) | Tensile Modulus (GPa) | Elongation at break (%) |
|---|---|---|---|---|---|
| 9 | 0.76 | 3.0 | 106 | 4.3 | 13 |
| 11 | 0.88 | 7.0 | 106 | 4.4 | 76 |
| PEEK 90 | 0.76 | 1.5 | 106 | 4.3 | 19 |
| PEEK 150 | 0.88 | 4.0 | 103 | 4.1 | 17 |
| PEEK 450 | 1.21 | 10.0 | 106 | 4.3 | 98 |

It will be appreciated from Table 6, that moulding the example 9 polymer having the same starting RV as PEEK 90, yields a polymer with properties more like PEEK 150. Similarly, Example 11, having the same starting RV as PEEK 150, has properties after moulding which are more like PEEK 450.

Advantageously, it is found that the shear heating and injection moulding process promotes the majority of the curing of the polymers and thus an increase in RV and improved properties. A post-cure step (e.g. heating at 400° C. for 2 hours) is not found to lead to a significant further increase in fracture toughness over "as moulded" samples.

Alternative phenylethynyl compounds which may be used as described above for 4-FPEB include the following:

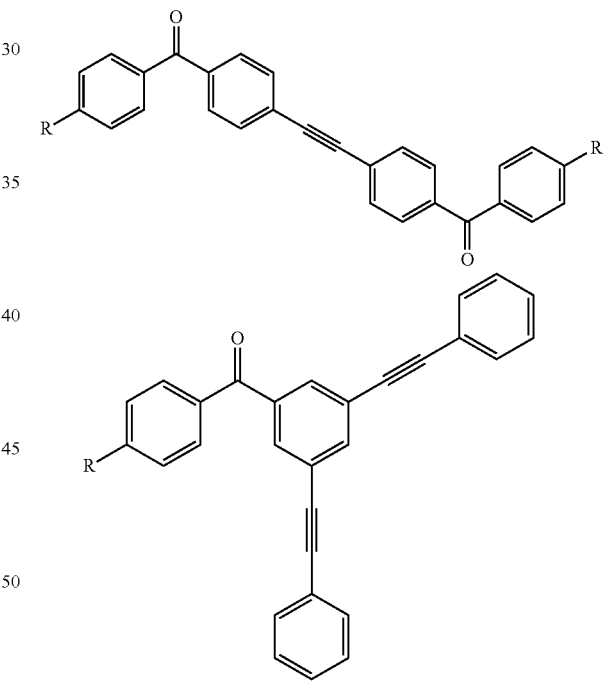

R=F or Cl

It should now be appreciated that the phenylethynyl compounds described can be used to improve mechanical properties of the polymers described whilst maintaining high levels of crystallinity. The polymer described may be used to produce thin walled parts by injection moulding—the relatively low RV polymer will be selected to flow into narrow sections of the mould; however during the moulding process (and/or thereafter) the RV of the polymer may be increased, whilst still maintaining substantial crystallinity. Alternatively, relatively low RV polymers may be used to produce highly-filled compounds. After mixing of the polymers and fillers, the RV of the polymer may be increased to enhance its physical properties whilst still retaining high levels of crystallinity.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polymeric material comprising repeat unit of formula I:

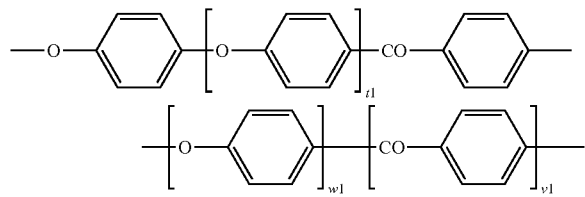

I wherein t1 and w1 independently represent 0 or 1 and v1 represents 0, 1 or 2;

wherein said polymeric material has a Reduced Viscosity (RV) of at least 0.6 dL/g: and wherein the polymeric material is end-capped with a phenylethynyl-containing moiety, wherein said polymeric material is a copolymer which includes a repeat unit or formula X

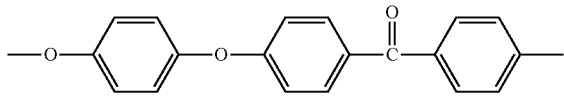

X and a repeat unit of formula XI

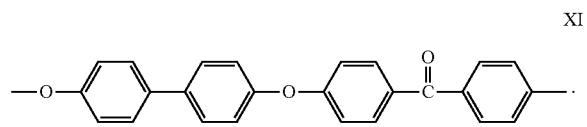

XI

2. A polymeric material according to claim 1, wherein the repeat units X and XI are in molar proportions X:XI of from 65:35 to 95:5.

3. A polymeric material according to claim 1, wherein said copolymer includes at least 68 mol% of repeat units of formula X and at least 10 mol% of repeat units of formula XI.

4. A method of making a component, the method comprising:
(i) selecting the polymeric material as described in claim 1; and
(ii) melt processing said polymeric material to form the component.

5. A method according to claim 4, wherein the RV of the melt-processed polymeric material is higher by at least 0.1 dL/g compared to the RV of said polymeric material.

6. A method according to claim 4, wherein the melt-processed polymeric material has a crystallinity of at least 20%.

7. A method according to claim 4, wherein the difference between the Tm of the polymeric material and the Tm of the melt-processed polymeric material is at least 1° C.; and the difference between the Tg of the polymeric material and the Tg of the melt-processed polymeric material is at least 2° C.

8. A composition comprising the polymeric material according to claim 1 and a filler.

9. A composition according to claim 8, wherein said polymeric material has a Tm of less than 350° C.

* * * * *